US006687117B2

(12) United States Patent
Liu et al.

(10) Patent No.: US 6,687,117 B2
(45) Date of Patent: Feb. 3, 2004

(54) ELECTROLYTES FOR CAPACITORS

(75) Inventors: Yanming Liu, Clarence Center, NY (US); Ashish Shah, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 0 days.

(21) Appl. No.: 10/354,324

(22) Filed: Jan. 30, 2003

(65) Prior Publication Data

US 2003/0142464 A1 Jul. 31, 2003

Related U.S. Application Data

(60) Provisional application No. 60/353,895, filed on Jan. 31, 2002.

(51) Int. Cl.$^7$ .......................... H01G 9/02; H01G 35/00
(52) U.S. Cl. ...................... 361/504; 29/25.03; 252/62.2
(58) Field of Search .............................. 361/503, 507; 252/62.2; 29/25.03

(56) References Cited

U.S. PATENT DOCUMENTS

| | | | |
|---|---|---|---|
| 3,638,077 A | 1/1972 | Chesnot | |
| 4,762,630 A | 8/1988 | Shinozaki et al. | |
| 4,774,011 A | 9/1988 | Mori et al. | |
| 4,885,115 A | 12/1989 | Yokoyama et al. | |
| 5,111,365 A | 5/1992 | Dapo | |
| 5,496,481 A | 3/1996 | Liu | |
| 5,507,966 A | 4/1996 | Liu | |
| 5,629,829 A * | 5/1997 | Ikeya | 361/505 |
| 6,261,434 B1 | 7/2001 | Melody et al. | |

\* cited by examiner

*Primary Examiner*—Dean A. Reichard
*Assistant Examiner*—Eric Thomas
(74) *Attorney, Agent, or Firm*—Michael F. Scalise

(57) ABSTRACT

The present invention is directed to an electrolyte for an electrolytic capacitor. The capacitor has an electrolytic anode and an electrochemical cathode. The electrolyte has water, a water soluble organic salt, and a relatively weak organic acid. This electrolyte is chemically compatible to aluminum and tantalum oxide dielectrics and withstands higher voltage while maintaining good conductivity. This makes the electrolyte especially useful for high voltage applications, such as occur in an implantable cardiac defibrillator.

43 Claims, No Drawings

ELECTROLYTES FOR CAPACITORS

CROSS-REFERENCE TO RELATED APPLICATION

This application claims priority from U.S. provisional application Serial No. 60/353,895, filed on Jan. 31, 2002.

BACKGROUND OF THE INVENTION

This invention is directed to an electrolyte for electrolytic capacitors. More particularly, the present invention relates to an electrolyte for high voltage wet tantulum or aluminum capacitors.

SUMMARY OF THE INVENTION

The present electrolyte is suitable for an electrolytic capacitor and includes water and an organic solvent having an ammonium salt of a relatively weak organic acid dissolved therein. The organic acid is used to achieve an appropriate pH, conductivity, and breakdown voltage for a particular capacitor application.

An exemplary capacitor includes an anode of a valve metal such as aluminum or tantalum provided with an oxide film on the surface as a dielectric. The oxide film is typically formed by an anodizing process. The anode is kept from contacting a cathode by a separator disposed there between. The separator is impregnated with the present electrolyte. The electrolyte has a relatively high conductivity and breakdown voltage, which ensures that the capacitor exhibits low series resistance while withstanding high voltage. As such, the electrolyte impregnated separator provides the conductivity between the anode and the cathode while supporting the rated voltage. The electrolyte impregnated separator also helps heal the dielectric oxide film on the anode during operation.

These and other aspects and advantages of the present invention will become increasingly more apparent to those skilled in the art by reference to the following description.

DETAILED DESCRIPTION OF THE PREFERRED EMBODIMENTS

An electrolyte according to the present invention preferably contains the following constituents, by weight: about 1% to about 80% de-ionized water and 0% to about 80% of an organic solvent along with about 1% to about 80% isobutyric acid and about 0.5% to about 50% of concentrated ammonium salt (28%). The organic solvent includes, but is not limited to, glycols, glycol ethers, polyethylene glycols, amides, esters, nitriles, linear carbonates, cyclic carbonates, and mixtures thereof.

Suitable glycols include, but are not limited to, ethylene glycol, diethylene glycol, propylene glycol, trimethylene glycol, and mixtures thereof.

Suitable glycol ethers include, but are not limited to, ethylene glycol monomethyl ether, ethylene glycol monoethyl ether, propylene glycol methyl ether, diethylene glycol methyl ether, dipropylene glycol methyl ether, glycol monobutyl ether, and mixtures thereof.

Suitable amides include formamide, dimethyl formamide, diethyl formamide, ethyl formamide, dimethyl acetamide, methyl acetamide, and mixtures thereof.

Suitable nitriles include acetonitrile, propionitrile, and mixtures thereof.

Cyclic esters such as γ-butyrolactone, γ-valerolactone and N-methyl-2-pyrrolidone are also useful solvents or co-solvents as are carbonates, both linear and cyclic. Suitable linear and cyclic carbonates include dimethyl carbonate, diethyl carbonate, ethyl methyl carbonate, dipropyl carbonate, ethyl propyl carbonate, methyl propyl carbonate, propylene carbonate, ethylene carbonate, butylenes carbonate, vinylene carbonate, and mixtures thereof.

Isobutyric acid can act as both a solvent and a solute. While isobutyric acid is preferred, other relatively weak organic acids of the general formula of $c_nH_{2+n}O_2$ (where n=2 to 7) are acceptable. Examples are butyric acid, propionic acid, valeric acid (pentanoic acid), methylbutyric acid, trimethylacetic acid, and mixtures thereof, among others coming under the purview of the above formula.

Ammonium hydroxide is added to react with the acid to form an ammonium salt in situ that provides electrical conductivity. Electrolyte pH and conductivity can be adjusted by the amount of ammonium hydroxide. Ammonium hydroxide can be substituted by an ammonium salt of the corresponding acid constituent. Examples of these salts are ammonium isobutyrate, ammonium butyrate, ammonium propionate, ammonium valerate, ammonium methylbutyrate, ammonium trimethylacetate, and mixtures thereof.

The electrolytes of the present invention are useful for not only conventional electrolytic capacitors, but also those of the electrolytic/electrochemical hybrid type. Capacitor cathodes commonly used in electrolytic capacitors include etched aluminum foil in aluminum electrolytic capacitors, and those commonly used in wet tantalum capacitors such as of silver, sintered valve metal powders, platinum black, and carbon. The cathode of hybrid capacitors include a pseudocapacitive coating of a transition metal oxide, nitride, carbide or carbon nitride, the transition metal being selected from the group consisting of ruthenium, cobalt, manganese, molybdenum, tungsten, tantalum, iron, niobium, iridium, titanium, zirconium, hafnium, rhodium, vanadium, osmium, palladium, platinum, and nickel. The pseudocapacitive coating is deposited on a conductive substrate such as of titanium or tantalum. The electrolytic/electrochemical hybrid capacitor has high energy density and is particularly useful for implantable medical devices such as a cardiac defibrillator.

The anode is of a valve metal consisting of the group vanadium, niobium, tantalum, aluminum, titanium, zirconium and hafnium. The anode can be a foil, etched foil, sintered powder, or any other form of porous substrate of these metals.

A preferred chemistry for a hybrid capacitor comprises a cathode electrode of a porous ruthenium oxide film provided on a titanium substrate coupled with an anode of a sintered tantalum powder pressed into a pellet. The cathode and anode electrodes are segregated from each other by a suitable separator material impregnated with the present working electrolyte. Such a capacitor is described in U.S. Pat. Nos. 5,894,403, 5,920,455 and 5,926,632. These patents are assigned to the assignee of the present invention and incorporated herein by reference.

Electrolytes of present invention may also contain phosphoric acid, an inorganic phosphate or an organic phosphate as an additive to improve anode stability. The examples of organic phosphates are trimethylphosphate, triethylphosphate, triisopropylphosphate, and mxtures thereof.

Finally, electrolytes of present invention may contain a nitroaromatic depolarizer to prevent cathodic gassing during operation. Suitable nitroaromatic compounds include, but are not limited to 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof.

The present electrolyte is useful for capacitors having an operating range of about 175 volts to about 400 volts while maintaining high conductivity. The preferred ruthenium oxide/tantalum hybrid capacitor provides high energy density at voltages of at least about 175 volts, such as is required in an implantable medical device, for example, a cardiac defibrillator. For this reason, it is important that the electrolyte have a high breakdown voltage, high conductivity, suitable pH and good chemical stability over the operating life of the device.

The present electrolyte is chemically compatible over time with the other capacitor components and capacitor materials, even at temperatures of about 105° C. This means that the electrolyte does not generate gas or promote corrosion of the other capacitor components at that temperature.

The following examples describe the manner and process of a capacitor according to the present invention, and they set forth the best mode contemplated by the inventors of carrying out the invention, but they are not to be construed as limiting.

EXAMPLE I

One exemplary electrolyte according to the present invention consists of the constituents listed in Table 1. The anode breakdown voltage measurements set forth in the below tables were conducted using a tantalum anode at room temperature.

TABLE 1

| Components | Wt. % | Amount |
| --- | --- | --- |
| ethylene glycol | 39.17 | 89.8 (ml) |
| deionized water | 52.88 | 135.0 (ml) |
| isobutyric acid | 6.0 | 16.1 (ml) |
| ammonium hydroxide (28%) | 1.5 | 4.3 (ml) |
| phosphoric acid (85%) | 0.06 | 0.09 (ml) |
| p-nitrophenol | 0.4 | 1.0 (g) |

It was determined that the above electrolyte had the physical characteristics listed in Table 2.

TABLE 2

| pH | 4.9 |
| --- | --- |
| Conductivity | 7.1 mS/cm |
| Anode Breakdown | 395 volts |

EXAMPLE II

Another exemplary electrolyte according to the present invention consists of the constituents listed in Table 3.

TABLE 3

| Components | Wt. % | Amount |
| --- | --- | --- |
| ethylene glycol | 39.71 | 359.4 (ml) |
| deionized water | 55.6 | 560.0 (ml) |

TABLE 3-continued

| Components | Wt. % | Amount |
| --- | --- | --- |
| isobutyric acid | 3.0 | 31.6 (ml) |
| ammonium hydroxide (28%) | 1.3 | 14.0 (ml) |
| phosphoric acid (85%) | 0.06 | 0.36 (ml) |
| p-nitrophenol | 0.4 | 4.0 (g) |

It was determined that the above electrolyte had the physical characteristics listed in Table 4.

TABLE 4

| pH | 5.4 |
| --- | --- |
| Conductivity | 6.9 mS/cm |
| Anode Breakdown | 400 volts |

EXAMPLE III

Another exemplary electrolyte according to the present invention consists of the constituents listed in Table 5.

TABLE 5

| Components | Wt. % | Amount |
| --- | --- | --- |
| ethylene glycol | 18.2 | 18.0 (ml) |
| deionized water | 9.1 | 10.0 (ml) |
| isobutyric acid | 64.5 | 74.7 (ml) |
| ammonium hydroxide (28%) | 8.2 | 10.0 (ml) |
| phosphoric acid (85%) | 0.09 | 0.06 (ml) |

It was determined that the above electrolyte had the physical characteristics listed in Table 6.

TABLE 6

| pH | 5.2 |
| --- | --- |
| Conductivity | 7.9 mS/cm |
| Anode Breakdown | 388 volts |

EXAMPLE IV

Another exemplary electrolyte according to the present invention consists of the constituents listed in Table 7.

TABLE 7

| Components | Wt. % | Amount |
| --- | --- | --- |
| deionized water | 44.88 | 100.0 (ml) |
| isobutyric acid | 13.5 | 31.6 (ml) |
| ammonium hydroxide (28%) | 3.2 | 8.0 (ml) |
| phosphoric acid (85%) | 0.04 | 0.06 (ml) |
| ethylene glycol monomethyl ether | 38.2 | 91.4 (ml) |

It was determined that the above electrolyte had the physical characteristics listed in Table 8.

TABLE 8

| pH | 5.7 |
| --- | --- |
| Conductivity | 11.5 mS/cm |
| Anode Breakdown | 380 volts |

EXAMPLE V

Another exemplary electrolyte according to the present invention consists of the constituents listed in Table 9.

TABLE 9

| Components | Wt. % | Amount |
| --- | --- | --- |
| deionized water | 4.69 | 10.0 (ml) |
| isobutyric acid | 37.5 | 84.2 (ml) |
| ammonium hydroxide (28%) | 10.6 | 25.0 (ml) |
| phosphoric acid (85%) | 0.05 | 0.06 (ml) |
| ethylene glycol monomethyl ether | 46.9 | 107.5 (ml) |

It was determined that the above electrolyte had the physical characteristics listed in Table 10.

TABLE 10

| pH | 6.7 |
| --- | --- |
| Conductivity | 10.8 mS/cm |
| Anode Breakdown | 370 volts |

It is appreciated that various modifications to the present inventive concepts described herein may be apparent to those of ordinary skill in the art without departing from the spirit and scope of the present invention as defined by the herein appended claims.

What is claimed is:

1. An electrolyte for an electrical energy storage device, the electrolyte consisting essentially of:
   a) water;
   b) an organic acid; and
   c) an ammonium salt of the organic acid.

2. The electrolyte of claim 1 wherein the water present in a range of, by weight, anout 1% to about 80%.

3. The electrolyte of claim 1 wherein the acid has the general formula of $c_nH_{2+n}O_2$ (where n=2 to 7).

4. The electrolyte of claim 1 wherein the acid is selected from the group consisting of isobutyric acid, butyric acid, propionic acid, valeric acid, methylbutyric acid, trimethylacetic acid, and mixtures thereof.

5. The electrolyte of claim 1 wherein the acid is present in a range of, by weight, about 1% to about 80%.

6. The electrolyte of claim 1 wherein the ammonium salt is selected from the group consisting of ammonium isobutyrate, ammonium butyrate, ammonium propionate, ammonium valerate, ammonium methylbutyrate, ammonium trimethylacetate, and mixtures thereof.

7. The electrolyte of claim 1 wherein the ammonium salt is present in a range of, by weight, 0.5% to about 50%.

8. An electrolyte for a capacitor, the electrolyte comprising:
   a) water;
   b) an organic solvent;
   c) an organic acid; and
   d) an ammonium salt of the organic acid.

9. The electrolyte of claim 8 wherein the organic solvent is selected from the group consisting of glycols, glycol ethers, polyethylene glycols, amides, esters, nitriles, linear carbonates, cyclic carbonates, and mixtures thereof.

10. The electrolyte of claim 9 wherein the glycol is selected from the group consisting of ethylene glycol, diethylene glycol, propylene glycol, trimethylene glycol, and mixtures thereof.

11. The electrolyte of claim 9 wherein the glycol ether is selected from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof.

12. The electrolyte of claim 9 wherein the amide is selected from the group consisting of formamide, dimethyl formamide, diethyl formamide, ethyl formamide, dimethyl acetamide, methyl acetamide, and mixtures thereof.

13. The electrolyte of claim 9 wherein the ester is selected from the group consisting of γ-butyrolactone, γ-valerolactone, N-methyl-2-pyrrolidone, and mixtures thereof.

14. The electrolyte of claim 9 wherein the nitrile is selected from the group consisting of acetonitrile, propionitrile, and mixtures thereof.

15. The electrolyte of claim 9 wherein the linear and cyclic carbonates are selected from the group consisting of dimethyl carbonate, diethyl carbonate, ethyl methyl carbonate, dipropyl carbonate, ethyl propyl carbonate, methyl propyl carbonate, propylene carbonate, ethylene carbonate, butylene carbonate, vinylene carbonate, and mixtures thereof.

16. The electrolyte of claim 8 wherein the organic acid is selected from the group consisting of isobutyric acid, butyric acid, propionic acid, valeric acid, methylbutyric acid, trimethylacetic acid, and mixtures thereof.

17. The electrolyte of claim 8 wherein the ammonium salt is selected from the group consisting of ammonium isobutyrate, ammonium butyrate, ammonium propionate, ammonium valerate, ammonium methylbutyrate, ammonium trimethylacetate, and mixtures thereof.

18. A capacitor, which comprises:
   a) an anode of a valve metal;
   b) an electrochemical cathode selected from the group consisting of a transition metal oxide, a transition metal nitride, a transition metal carbide and a transition metal carbon nitride; and
   c) an electrolyte for the anode and the cathode, the electrolyte comprising:
      i) water;
      ii) an organic solvent;
      iii) an organic acid; and
      iv) an ammonium salt of the organic acid.

19. The capacitor of claim 18 wherein the organic acid is selected from the group consisting of isobutyric acid, butyric acid, propionic acid, valeric acid, methylbutyric acid, trimethylacetic acid, and mixtures thereof.

20. The capacitor of claim 18 wherein the ammonium salt is selected from the group consisting of ammonium isobutyrate, ammonium butyrate, ammonium propionate, ammonium valerate, ammonium methylbutyrate, ammonium trimethylacetate, and mixtures thereof.

21. The capacitor of claim 18 wherein the organic solvent is selected from the group consisting of glycols, glycol ethers, polyethylene glycols, amides, esters, nitriles, linear carbonates, cyclic carbonates, and mixtures thereof.

22. The capacitor of claim 21 wherein the glycol is selected from the group consisting of ethylene glycol, diethylene glycol, propylene glycol, trimethylene glycol, and mixtures thereof.

23. The capacitor of claim 21 wherein the glycol ether is selected from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof.

24. The capacitor of claim 21 wherein the amide is selected from the group consisting of formamide, dimethyl formamide, diethyl formamide, ethyl formamide, dimethyl acetamide, methyl acetamide, and mixtures thereof.

25. The capacitor of claim 21 wherein the ester is selected from the group consisting of γ-butyrolactone, γ-valerolactone, N-methyl-2-pyrrolidone, and mixtures thereof.

26. The capacitor of claim 21 wherein the nitrile is selected from the group consisting of acetonitrile, propionitrile, and mixtures thereof.

27. The capacitor of claim 21 wherein the linear and cyclic carbonates are selected from the group consisting of dimethyl carbonate, diethyl carbonate, ethyl methyl carbonate, dipropyl carbonate, ethyl propyl carbonate, methyl propyl carbonate, propylene carbonate, ethylene carbonate, butylenes carbonate, vinylene carbonate, and mixtures thereof.

28. The capacitor of claim 18 wherein the valve metal is selected from the group consisting of tantalum, vanadium, niobium, aluminum, titanium, zirconium, hafnium, and mixtures thereof.

29. The capacitor of claim 18 wherein the transition metal is selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and mixtures thereof.

30. The capacitor of claim 18 wherein the cathode is of ruthenium oxide and the anode is of tanatlum.

31. The capacitor of claim 18 wherein the electrolyte includes at least one of the group consisting of phosphoric acid, trimethylphosphate, triethylphosphate, and triisopropylphosphate.

32. The capacitor of claim 18 wherein the electrolyte includes a nitroaromatic compound selected from the group consisting of 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2- nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof.

33. A method for providing an electrolyte, consisting essentially of the steps of:
a) providing water;
b) providing an organic acid; and
c) providing an ammonium salt of the organic acid.

34. The method of claim 33 including selecting the organic acid from the group consisting of isobutyric acid, butyric acid, propionic acid, valeric acid, methylbutyric acid, trimethylacetic acid, and mixtures thereof.

35. The method of claim 33 including providing ammounium hydroxide therein to provide the ammonium salt.

36. The method of claim 33 including selecting the ammonium salt from the group consisting of ammonium isobutyrate, ammonium butyrate, ammonium propionate, ammonium valerate, ammonium methylbutyrate, ammonium trimethylacetate, and mixtures thereof.

37. The method of claim 33 further including an organic solvent selected from the group consisting of glycols, glycol ethers, polyethylene glycols, amides, esters, nitriles, linear carbonates, cyclic carbonates, and mixtures thereof.

38. The method of claim 37 including selecting the glycol from the group consisting of ethylene glycol, diethylene glycol, propylene glycol, trimethylene glycol, and mixtures thereof.

39. The method of claim 37 including selecting the glycol ether from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof.

40. The method of claim 37 including selecting the amide from the group consisting of formamide, dimethyl formamide, diethyl formamide, ethyl formamide, dimethyl acetamide, methyl acetamide, and mixtures thereof.

41. The method of claim 37 including selecting the ester from the group consisting of γ-butyrolactone, γ-valerolactone, N-methyl-2-pyrrolidone, and mixtures thereof.

42. The method of claim 37 including selecting the nitrile from the group consisting of acetonitrile, propionitrile, and mixtures thereof.

43. The method of claim 37 including selecting the linear and cyclic carbonates from the group consisting of dimethyl carbonate, diethyl carbonate, ethyl methyl carbonate, dipropyl carbonate, ethyl propyl carbonate, methyl propyl carbonate, propylene carbonate, ethylene carbonate, butylenes carbonate, vinylene carbonate, and mixtures thereof.

* * * * *

UNITED STATES PATENT AND TRADEMARK OFFICE
CERTIFICATE OF CORRECTION

PATENT NO. : 6,687,117 B2
DATED : February 3, 2004
INVENTOR(S) : Liu et al.

It is certified that error appears in the above-identified patent and that said Letters Patent is hereby corrected as shown below:

Column 5,
Line 32, before "present" insert -- is --

Column 7,
Line 2, "y-butyrolactone" should be -- γ-butyrolactone --

Signed and Sealed this

Fifteenth Day of June, 2004

JON W. DUDAS
*Acting Director of the United States Patent and Trademark Office*